US010518725B2

(12) United States Patent
Masui et al.

(10) Patent No.: US 10,518,725 B2
(45) Date of Patent: Dec. 31, 2019

(54) POWER DISTRIBUTION SYSTEM

(71) Applicant: Yazaki Corporation, Tokyo (JP)

(72) Inventors: Hideaki Masui, Makinohara (JP);
Katsuyuki Iwasaki, Makinohara (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 15/911,437

(22) Filed: Mar. 5, 2018

(65) Prior Publication Data
US 2018/0334118 A1    Nov. 22, 2018

(30) Foreign Application Priority Data

May 18, 2017    (JP) .................................. 2017-098661

(51) Int. Cl.
*H02J 7/00*    (2006.01)
*B60R 16/033*   (2006.01)
*H02M 3/335*    (2006.01)

(52) U.S. Cl.
CPC .......... *B60R 16/033* (2013.01); *H02J 7/0014* (2013.01); *H02J 7/0063* (2013.01); *H02J 7/0068* (2013.01); *H02M 3/33584* (2013.01); *B60L 2210/10* (2013.01); *H02J 2007/0067* (2013.01)

(58) Field of Classification Search
CPC ...... H02J 7/0014; H02J 7/0063; B60R 16/033
USPC .......................... 320/104, 119, 134, 140, 163
See application file for complete search history.

(56) References Cited

U.S. PATENT DOCUMENTS

| 2009/0108677 | A1* | 4/2009 | Walter | ................ | H02M 3/1582 307/80 |
| 2010/0314945 | A1* | 12/2010 | Yamazaki | ............. | H02M 3/157 307/80 |
| 2011/0025124 | A1* | 2/2011 | Brabec | ................ | B60L 11/1809 307/9.1 |
| 2017/0080883 | A1 | 3/2017 | Yasunori et al. | | |

FOREIGN PATENT DOCUMENTS

JP    2015-214274 A    12/2015

* cited by examiner

*Primary Examiner* — Edward Tso
*Assistant Examiner* — Aaron Piggush
(74) *Attorney, Agent, or Firm* — Sughrue Mion, PLLC

(57) ABSTRACT

Provided is a power distribution system for improving reliability of power supply to the load in a case where a bidirectional DC/DC converter is connected to one power supply when making a power supply redundant, connecting a first battery and a second battery so as to supply power to a load, including: a bidirectional DC/DC converter detecting an output of the first battery and an output of the second battery, and controlling charge and discharge operation of the second battery: and a control unit detecting the output voltage of the first battery and the output voltage of the second battery, and determining from which one of the first battery and the second battery power should be supplied to the load based on detection results by the control unit and the bidirectional DC/DC converter.

4 Claims, 8 Drawing Sheets

FIG.5A

| | VEHICLE STATE | IG RELAY | SWITCHING RELAY | DC/DC CONTROL | LOAD POWER SUPPLY |
|---|---|---|---|---|---|
| NORMAL | NORMAL RUNNING | ON | OFF | CHARGE DIRECTION | MAIN BATTERY ALTERNATOR |
| | SAILING RUNNING | ON | OFF | DISCHARGE DIRECTION | MAIN BATTERY SUB BATTERY |

FIG.5B

| | VEHICLE STATE | IG RELAY | SWITCHING RELAY | DC/DC CONTROL | LOAD POWER SUPPLY |
|---|---|---|---|---|---|
| FAILURE | MAIN BATTERY FAULT | OFF | ON | STOP | SUB BATTERY |
| | SUB BATTERY FAULT | ON | OFF | STOP | MAIN BATTERY |

FIG.8A

| MAIN BATTERY VOLTAGE STATE | SUB BATTERY VOLTAGE STATE | CONTROL UNIT DETERMINATION | DC/DC DETERMINATION | FAULT DETERMINATION |
|---|---|---|---|---|
| NORMAL | NORMAL | NORMAL | NORMAL | NORMAL |
| NORMAL | NORMAL | NORMAL | REDUCTION | |
| NORMAL | NORMAL | REDUCTION | NORMAL | MAIN BATTERY FAULT |
| NORMAL | NORMAL | REDUCTION | REDUCTION | |
| NORMAL | NORMAL | NORMAL | NORMAL | NORMAL |
| NORMAL | NORMAL | NORMAL | REDUCTION | |
| NORMAL | NORMAL | REDUCTION | NORMAL | SUB BATTERY FAULT |
| NORMAL | NORMAL | REDUCTION | REDUCTION | |

FIG.8B

| MAIN BATTERY VOLTAGE STATE | SUB BATTERY VOLTAGE STATE | CONTROL UNIT DETERMINATION | DC/DC DETERMINATION | OPERATION |
|---|---|---|---|---|
| | | NORMAL | NORMAL | NORMAL |
| | | NORMAL | REDUCTION | |
| | | REDUCTION | NORMAL | MAIN BATTERY FAULT |
| | | REDUCTION | REDUCTION | |
| | | NORMAL | NORMAL | NORMAL |
| | | NORMAL | REDUCTION | |
| | | REDUCTION | NORMAL | SUB BATTERY FAULT |
| | | REDUCTION | REDUCTION | |

POWER DISTRIBUTION SYSTEM

BACKGROUND OF THE INVENTION

Field of the Invention

The present invention relates to a distribution system connecting a main battery and a sub battery, so as to distribute power to a load.

Description of the Related Art

In recent years, technological development related to ADAS (Advanced Driving Safety Assistance System) of vehicles or automatic operation has advanced. Since the control device or various sensors used for these operate with electric power, the function thereof cannot be sufficiently exerted if the power supply from the power supply is delayed. In order to avoid such situation, it has been carried out to install a plurality of batteries in the vehicle to make the power supply redundant.

Regarding the redundancy of the power supply, Patent Document 1 discloses a power supply device as shown in FIG. 8. In this power supply device, the main battery 301 and the sub battery 302 make the power supply redundant, and both batteries are connected to the power supply box 331. In the power supply box 331, a load 322 such as a motor, and a load 323 such as a lamp are connected in parallel.

A microcomputer 332 is provided in the power supply box 331, and a power supply monitoring unit 333 and a relay control unit 334 are provided. The power source monitoring unit 333 monitors output voltages of the main battery 301 and the sub battery 302 and drives the relay control unit 334 based on the monitoring result, thereby controlling opening and closing operation of the relay 312 of the main battery system and the relay 313 of the sub battery system.

According to the power supply device described in Patent Document 1, for example, it is possible to perform controls of monitoring an output voltage of the main battery 301 and the sub battery 302, and avoid supplying power to a load from a battery whose output voltage is below a predetermined threshold value. This can stably supply power to the load in the case that one of batteries fails.

When redundant power supply is used, lithium-ion battery has been put to practical use as a sub battery, instead of a conventional lead battery. Though Lithium-ion battery has the features of high energy density, small size and light weight, strict voltage control is required for charging, and a bidirectional DC/DC converter is therefore generally used.

Patent Document

Patent Document 1: Japanese Unexamined Patent Application Publication No. 2015-214274

SUMMARY OF THE INVENTION

In the power supply device described in the Patent Document 1, even when using Lithium-ion battery as sub battery, and further providing bidirectional DC/DC converter, it is conceivable to improve reliability for power supply to the load by controlling power supply path based on the output voltage of each battery.

However, it is desirable to also consider failure of control system such as decrease of output voltage as well as fault of the battery itself for further improvement of reliability.

Therefore, the present invention aims at improving reliability of power supply to the load when connecting bidirectional DC/DC converter to one of the batteries upon usage of redundant power supply.

In order to solve the above problems, a power distribution system according to one embodiment of the present invention connecting a first battery and a second battery so as to supply power to a load, includes a bidirectional DC/DC converter detecting an output of the first battery and an output of the second battery, and controlling charge and discharge operation of the second battery, and a control unit detecting the output voltage of the first battery and the output voltage of the second battery, and determining from which one of the first battery and the second battery power should be supplied to the load based on detection results by the control unit and the bidirectional DC/DC converter.

Here, the control unit can determine that power should be supplied from the second battery to the load when at least one of the control unit and the DC/DC converter detects an output voltage drop of the first battery.

Alternatively, the control unit may determine that power should be supplied from the second battery to the load when both the control unit and the DC/DC converter detect an output voltage drop of the first battery.

According to the present invention, when the power supply is made redundant, in a case where a bidirectional DC/DC converter is connected to one power supply, the reliability of the power supply to the load can be improved.

BRIEF DESCRIPTION OF THE DRAWINGS

FIGS. 5A and 5B are diagrams for explaining control contents of a relay control unit and a DC/DC converter control unit;

FIGS. 8A and 8B are diagrams for explaining criteria of a determination unit;

DETAILED DESCRIPTION OF THE PREFERRED EMBODIMENT

Figure 1:
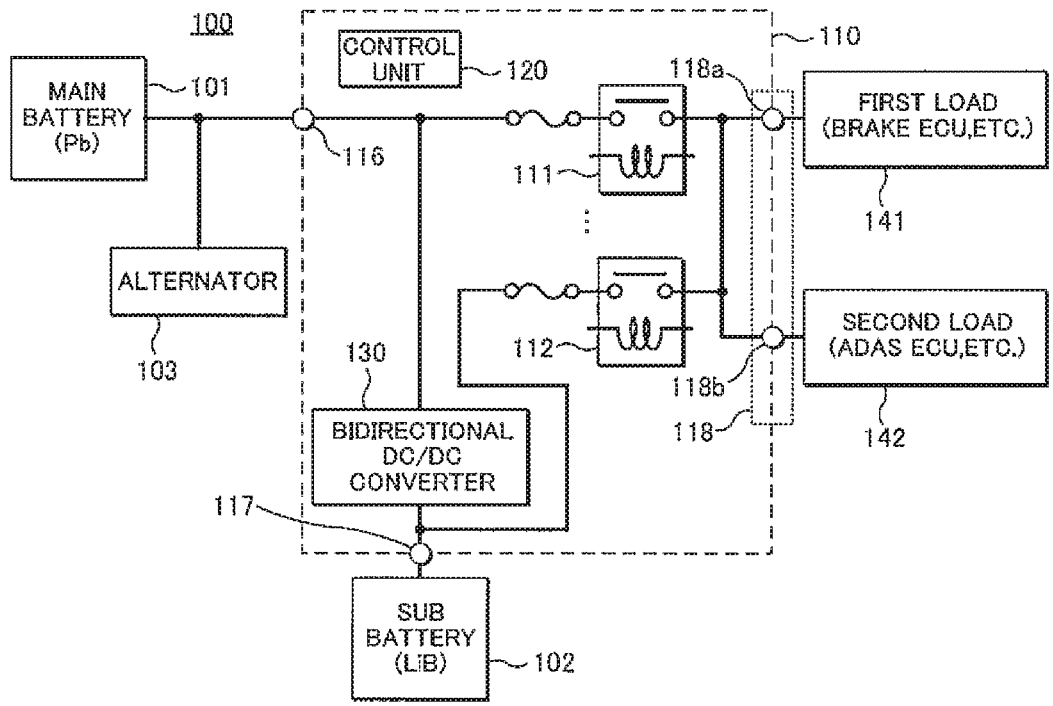
FIG. 1 is a diagram illustrating a power supply device of a vehicle according to a present embodiment.

Embodiments of the present invention will be described in detail with reference to the drawings. FIG. 1 is a diagram illustrating a power supply device 100 of a vehicle according to a present embodiment. The power supply device 100 is made such that a power source is made redundant with a main battery 101 and the sub battery 102, and both batteries are connected to the power distribution system 110.

Further, the power distribution system 110 is provided with a first load 141 such as a brake ECU, a second load 142 such as an ADAS ECU connected thereto. These loads require stable supply electric power while the vehicle is running. However, the load connected to the power distribution system 110 is not limited to these.

The main battery 101 can be, for example, a lead battery (Pb). Moreover, the sub battery 102 can be, for example, a lithium-ion battery (LiB). Since lithium ion battery (LiB) requires strict voltage control during charging, the power distribution system 110 includes a bidirectional DC/DC converter 130.

For example, the main battery 101 functions as the first battery, the sub battery 102 as the second battery. The battery used as the sub battery 102 is, however, not limited to lithium ion battery. For example, capacitor or the like may be used.

Further, the power distribution system 110 includes an IG relay 111, a switching relay 112, a control unit 120, a main terminal 116 to be connected to the main battery 101, and a sub terminal 117 to be connected to the sub battery 102, and a load terminal 118 to be connected to the load.

In the example of this figure, a plurality of load terminals 118 is connected in parallel, and the first load 141 is connected to the load terminal 118a, and the second load 142 is connected to the load terminal 118b. An alternator 103 is also connected to the main terminal 116. Note that a relay, a power supply wiring, a fuse, a load, etc. that are unnecessary for the description of the present embodiment are not described in the description.

Figures 2A, 2B:
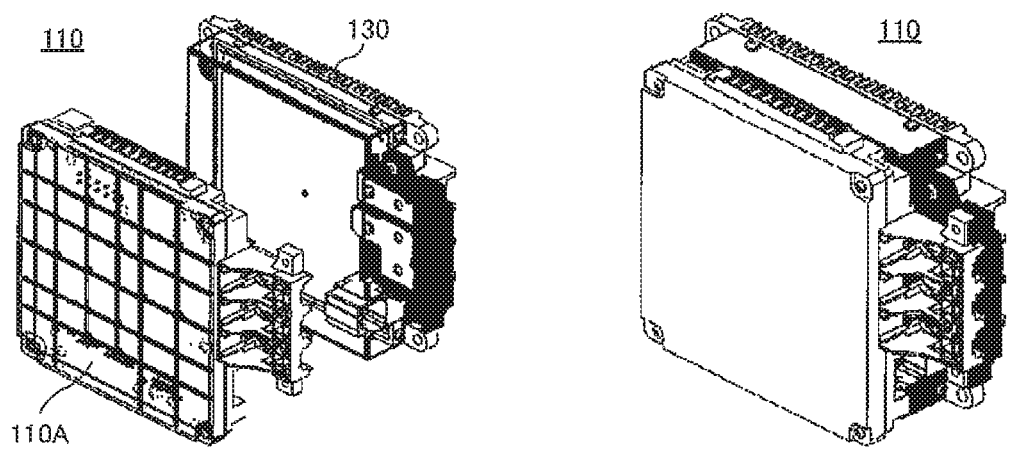
FIGS. 2A and 2B are diagrams illustrating a bidirectional DC/DC converter 130 and a power distribution unit.

The power distribution system 110 is also discriminated between a bidirectional DC/DC converter 130 and a power distribution unit 110A constituted by components other than the power distribution unit. The bidirectional DC/DC converter 130 and the power distribution unit 110A do not communicate with each other. As shown in FIG. 2 they are structured not to be integrated. Here, FIG. 2A is a diagram when the power distribution unit 110A and the bidirectional DC/DC converter 130 are separated, and FIG. 2B is a diagram when both are integrated.

Since the bidirectional DC/DC converter 130 and the power distribution unit 110A are made integrated, it is possible to reduce larger diameter power electrical wire for connecting the both, and enhancing noise resistance by minimizing length of signal line for communication. Furthermore, it is possible to prepare a plurality of specifications and facilitate modification of combination according to a to-be-loaded object vehicle or of design change.

Returning to FIG. 1, the bidirectional DC/DC converter 130 is connected between the main terminal 116 and the sub terminal 117, the IG relay 111 is connected between the main terminal 116 and the load terminal 118, and the switching relay 112 is connected between the sub terminal 117 and the load terminal 118.

The bidirectional DC/DC converter 130 connecting the sub battery 102 via the sub terminal 117 can switch the three states of charging direction, discharging direction, and stopping as its operating direction. A charging direction is a power transfer from the main terminal 116 to the sub terminal 117, and a discharging direction is a power transfer from the sub terminal 117 to the main terminal 116. Here, presence or absence of boost or step down of voltage does not matter. Stopping is a state in which power is not transmitted in either direction.

The control unit 120 can be configured using a microcomputer or the like, and according to a program or the like controls the operation direction of the bidirectional DC/DC converter 130, the opening and closing operation of the IG relay 111, the closing operation of the switching relay 112 and the like.

Figure 3:
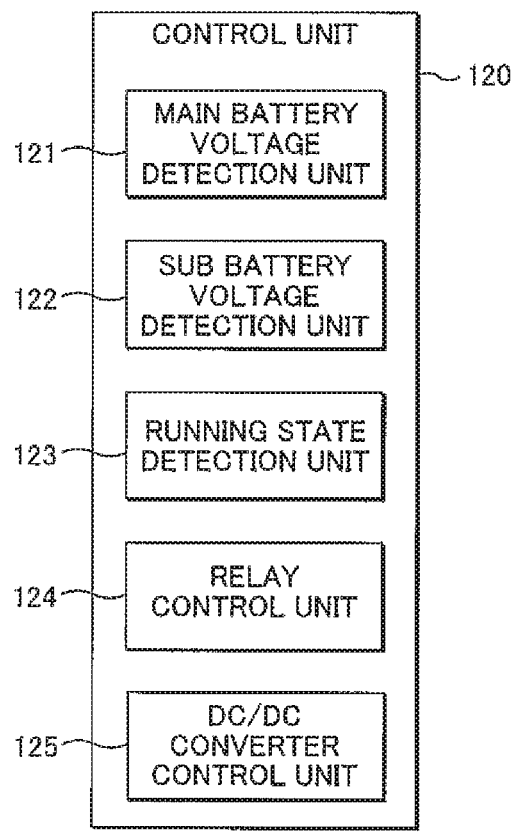
FIG. 3 is a functional block diagram of a control unit.

FIG. 3 is a functional block diagram of the control unit 120. As shown in the figure, the control unit 120 is provided with a main battery voltage detection unit 121, a sub battery voltage detection unit 122, a running state detection unit 123, a relay control unit 124, and a DC/DC converter control unit 125.

The main battery voltage detection unit 121 detects voltage of the main battery 101 connected to the main terminal 116. The sub battery voltage detection unit 122 detects voltage of the sub battery 102 connected via the sub terminal 117.

The running state detection unit 123 determines whether the vehicle during traveling is in a normal running state or in a sailing state. Here, the sailing state is a state in which after the acceleration, the engine is stopped and inertial traveling. For example, the running state detection unit 123 communicates with the host device, thereby discriminating the running state.

The relay control unit 124 detects opening closing operation of the IG relay 111 and the switching relay 112. The DC/DC converter control unit 125 controls operational direction of the bidirectional DC/DC converter. The relay control unit 124 and the DC/DC converter control unit 125, as the following description, determines default of the main battery 101 or the sub battery 102 based on the main battery voltage detection unit 121, the sub battery voltage detection unit 122 and the like.

Figure 4:
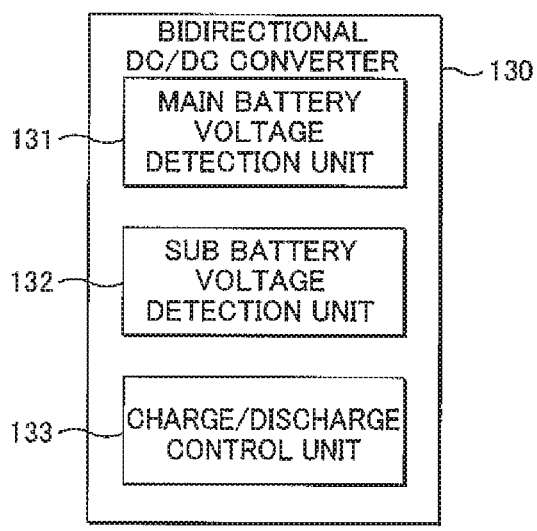
FIG. 4 is a functional block diagram of the bidirectional DC/DC converter.

FIG. 4 is a functional block diagram of the bidirectional DC/DC converter 130. As shown in this figure, the bidirectional DC/DC converter 130 includes a main battery voltage detection unit 131, a sub battery voltage detection unit 132, and a charge/discharge control unit 133.

The main battery voltage detection unit 131 detects the voltage of the main battery 101, and notifies the control unit 120 when a decrease in the output voltage of the battery 101 is detected. The sub battery voltage detection unit 132 detects the voltage of the sub-battery 102 and notifies the control unit 120 when a drop of voltage of the sub battery 102 is detected. In addition, conventionally, bidirectional DC/DC converter measures the input/output voltage for the charge/discharge control operation, and this function is applied to the main battery voltage detection unit 131 and the sub-battery voltage detection unit 132 of this embodiment.

Under the control of the DC/DC converter control unit 125, the charge/discharge control unit 133 controls the charging direction, discharging direction, and stopping, performs DC voltage conversion processing as necessary, and it thereby controls the charging/discharging operation of the sub-battery 102.

FIGS. 5A and 5B illustrate control contents of the relay control unit 124 and the DC/DC converter control unit 125. In this figure, the state where the vehicle is normally traveling (FIG. 5A) and the state where the main battery 101, and the sub-battery 102 in the battery failure state (FIG. 5B) are discriminated.

In the normal traveling state (FIG. 5A), if the vehicle is traveling normally, the relay control unit 124 turns on the IG relay 111 (close) and turns off the switching relay 112 (open), as well as the DC/DC converter control unit 125 sets the operation direction of the bidirectional DC/DC converter 130 to charging direction.

Figure 6A:
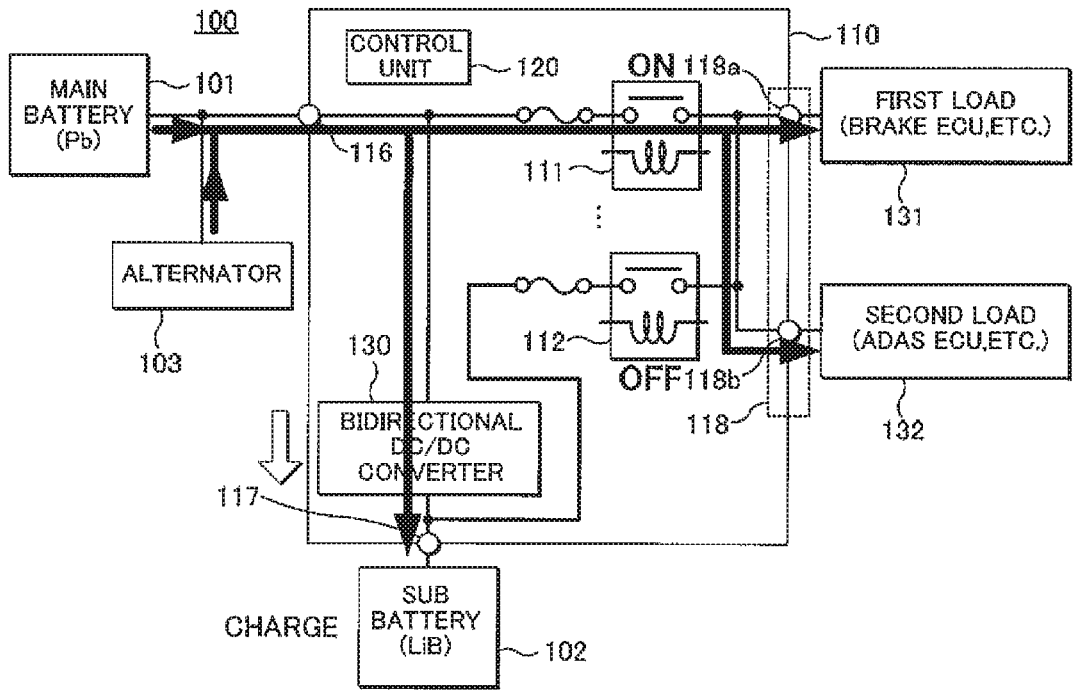
FIGS. 6A and 6B are diagrams for explaining a power transmission path during normal traveling.
Figure 6B:
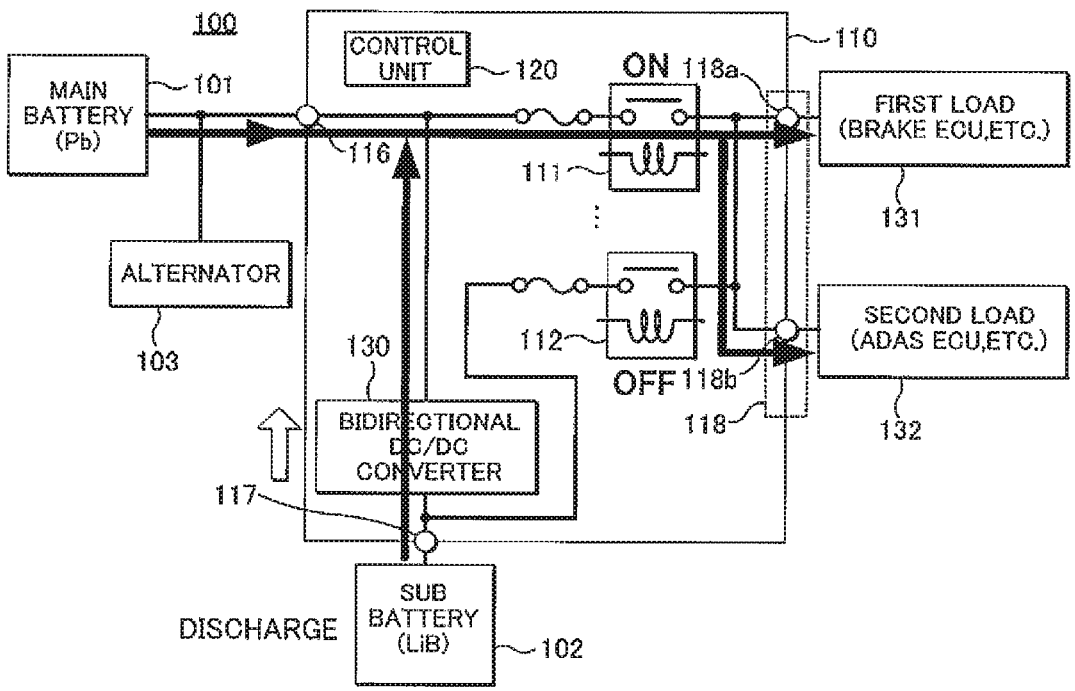

As a result, power is supplied to the load from the main battery 101 and the alternator 103. Further, by the control of the bidirectional DC/DC converter 130, the sub battery is discharged. FIG. 6A schematically shows the power supply path at this time.

On the other hand, in the case of sailing running in a state where the vehicle is traveling normally, the relay control unit 124 turns on the G relay 111, turns off the switching relay 112, as well as the DC/DC converter control section 125 sets the operation direction of the bidirectional DC/DC converter 130 to the discharge direction. This is because the alternator 103 does not generate electricity during sailing.

As a result, power is supplied to the load from the main battery 101 and the sub-battery 102. The sub battery 102 is controlled by the bidirectional DC/DC converter 130 to discharge. FIG. GB schematically shows the power supply path at this time.

In a state in which a battery failure occurs (FIG. 5B), the following control is performed. In the case of a faulty of the main battery, the relay control unit 124 turns off the IG relay 111, and turns on the switching unit 112, as well as the DC/DC converter control unit 125 stops the bidirectional DC/DC. In addition, the bidirectional DC/DC converter 130 controls the battery 102 to a discharged state.

Figure 7A:
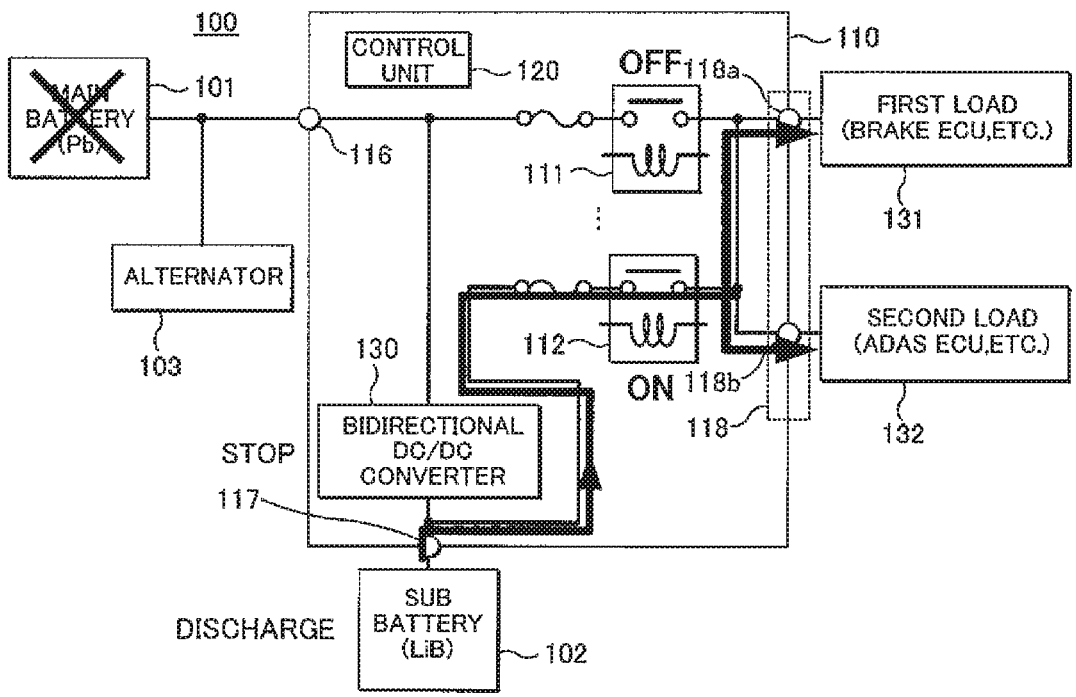
FIGS. 7A and 7B are diagrams for explaining a power transmission path when a battery fails.

As a result, power supply to the load is performed from the sub-battery 102. FIG. 7A schematically shows the power supply path at this time.

In the case of a sub battery failure, the relay control unit 124 turns on the IG relay 111, turns off the relay 112, as well as the DC/DC converter control unit 125 stops the bidirectional DC/DC converter 130.

Figure 7B:
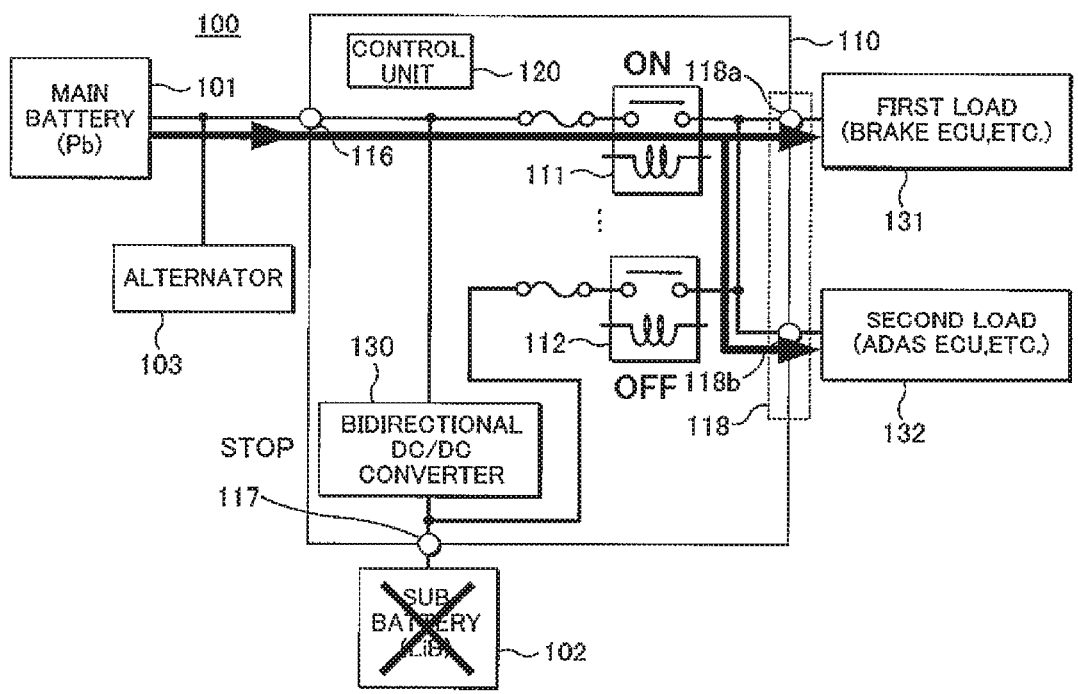

As a result, power is supplied to the load from the main battery 101. FIG. 7B schematically shows the power supply path at this time. In addition to the main battery 101, power may also be supplied from the alternator 103.

Next, the judgment of the main battery failure and the sub battery failure will be described. In the determination of the failure of the main battery and the sub battery failure, the control unit 120 performs based on the voltage detection result by its own of the main battery 101 and the sub battery 102, and the voltage detection result of the main battery 101 and the sub battery 102 by the bidirectional DC/DC converter 130.

In other words, not only the voltage detection result of the control unit 120 but also the bidirectional DC/DC converter 130 are used for determining the battery fault. In this way, in the embodiment, by making the voltage detection result used for judging the battery failure redundant, thereby improving the reliability of power supply.

In the present embodiment, criteria for battery failure is enough to judge using the voltage detection result of the control unit 120 and the voltage detection result of the bidirectional DC/DC converter 130 and judge for the battery failure can be arbitrary.

For example, as shown in FIG. 8A, when at least one of the control unit 120 and the bidirectional DC/DC converter 130 detects the voltage drop of the main battery 101, the main battery can be determined to be faulty, and when at least one of them detects a voltage drop of the sub-battery 102, the sub battery can be determined to be faulty. That is, judgment is made by logical sum (OR).

Alternatively, as shown in FIG. 8B, when both the controller 120 and the bidirectional DC/DC converter 130 detect the voltage drop of the main battery 101, it is judged that the main battery has failed, and when both detect a voltage drop of the sub-battery 102, it is judged that the sub battery is faulty. That is, judgment is made by logical product (AND).

In either case, as described above, when it is determined that the main battery is faulty, power is supplied from the sub battery 102, and when it is judged that the sub battery is faulty, power is supplied from the main battery 101.

As described above, according to the power distribution system 110 of the present embodiment, since detection of the battery voltage drop is made redundant, false detection of battery failure is prevented, improving reliability of power supply to load.

Figure 9A:
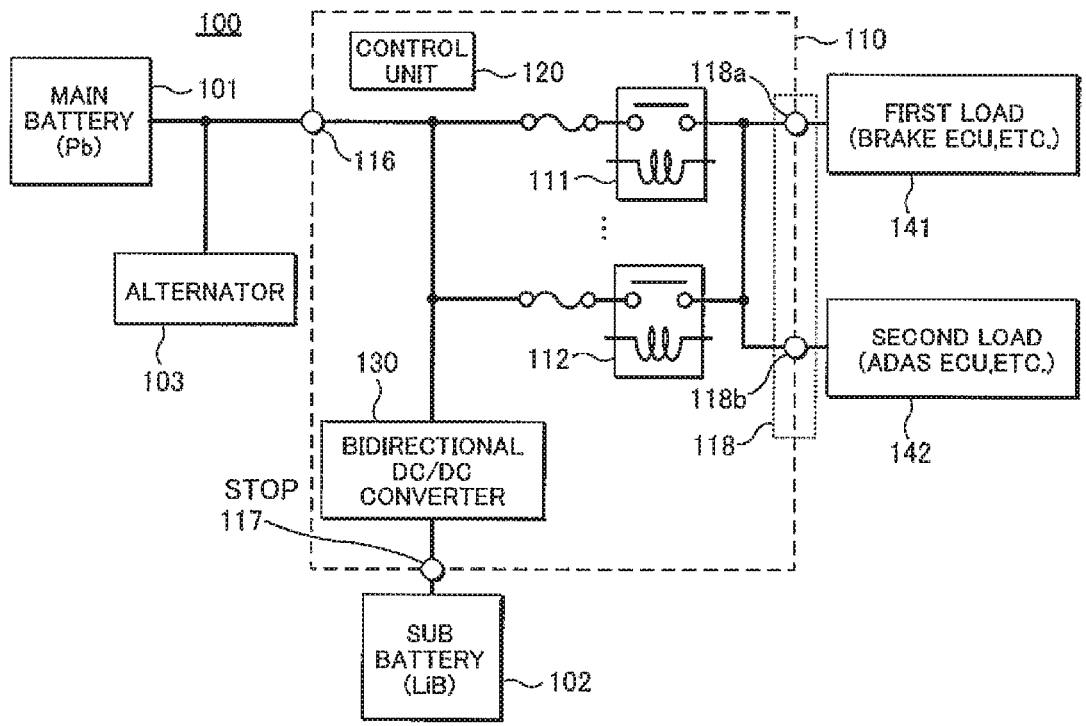
FIGS. 9A and 9B are diagrams illustrating another example of a power supply device.

In the above example, the switching relay 112 is connected between the sub terminal 117 and the load terminal 118, but, as shown in FIG. 9A, the switching relay 112 may be connected to the main terminal 116 and the load terminal 118.

Figure 9B:
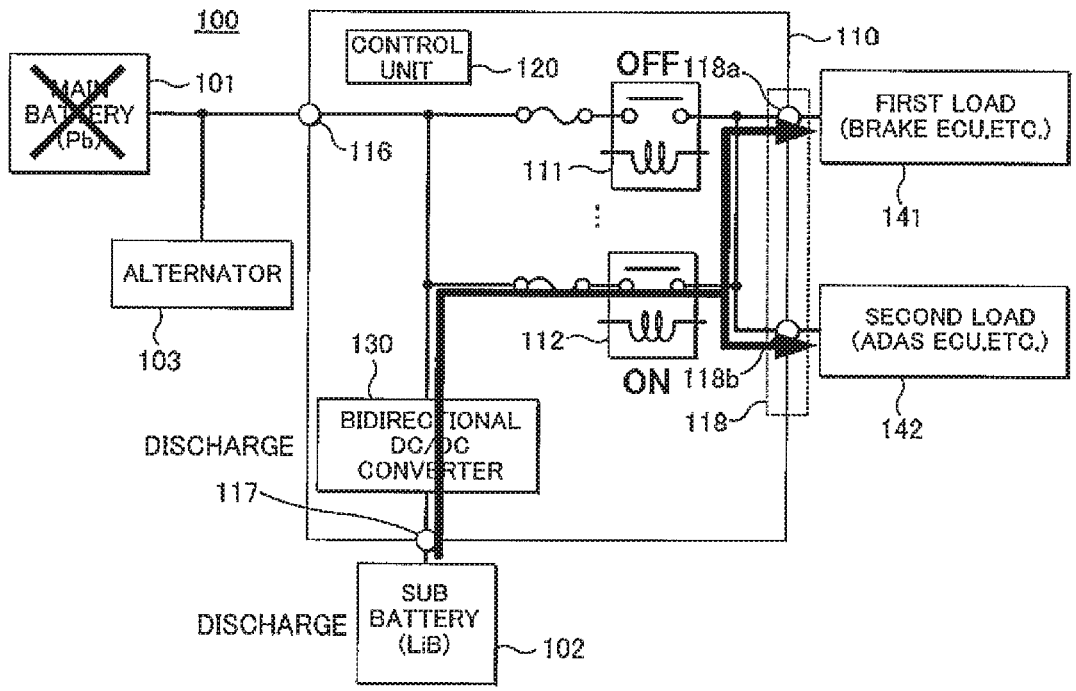
Figure 10:
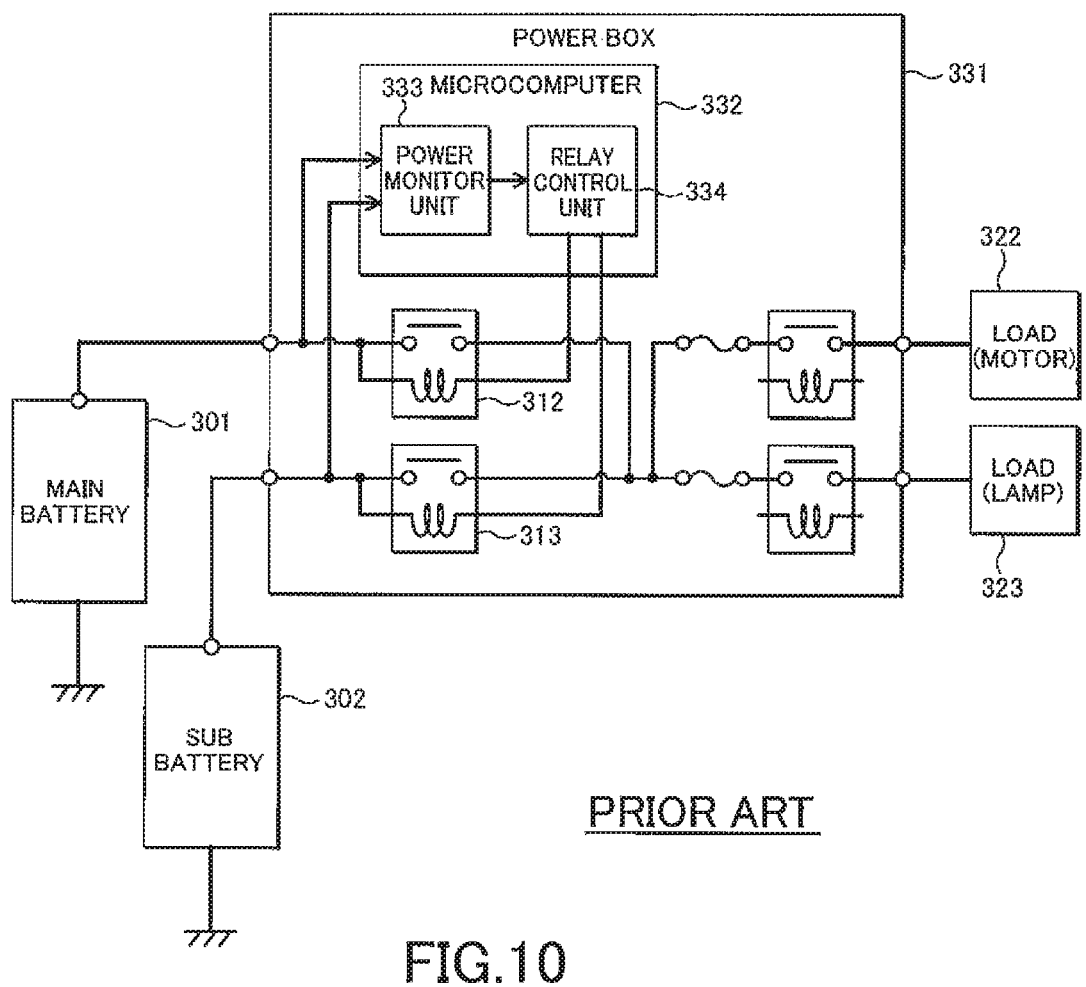
FIG. 10 is a diagram showing an example of conventional power supply redundancy.

In this case, when the main battery fails, as shown in FIG. 9B, the relay control unit 124 turns off the IG relay 111, turns on the switching relay 112, and the DC/DC converter control unit 125 may set the operation direction of the bidirectional DC/DC converter 130 to the discharge direction.

DESCRIPTION OF SYMBOLS

100 Power Supply
101 Main battery
102 Sub battery
103 Alternator
110 Power Distribution System
110A Power distribution unit
111 IG relay
116 Main terminal
117 Sub terminal
118 Load terminal
120 Control unit
121 Main battery voltage detection unit
122 Sub battery voltage detection unit
123 Running state detection unit
124 Relay control unit
125 DC/DC converter control unit
130 Bidirectional DC/DC converter
131 Main battery voltage detection unit
132 Sub battery voltage detection unit
133 Charge/discharge control unit
142 First load
142 Second load

What is claimed is:

1. A power distribution system connecting a first battery and a second battery so as to supply power to a load, comprising:
    a bidirectional DC/DC converter detecting an output of the first battery and an output of the second battery, and controlling charge and discharge operations of the second battery: and
    a control unit detecting output voltage of the first battery and output voltage of the second battery, and determining from which one of the first battery and the second battery power should be supplied to the load based on both a detection result by the control unit and a detecting result by the bidirectional DC/DC converter.

2. The power distribution system according to claim 1, wherein the control unit determines that power should be supplied from the second battery to the load when at least one of the control unit and the bidirectional DC/DC converter detects an output voltage drop of the first battery.

3. The power distribution system according to claim 2, wherein the control unit determines that power should be supplied from the second battery to the load when both the control unit and the bidirectional DC/DC converter detect an output voltage drop of the first battery.

4. The power distribution system according to claim 1, further comprising a first relay connected between the first battery and the load; and a second relay connected between the second battery and the load, wherein the control unit, when determining that power is supplied to the load by the first battery, closes only the first relay and stops the bidirectional DC/DC convertor, and when determining that power is supplied to the load by the second battery, closes only the second relay and stops the bidirectional DC/DC convertor.

* * * * *